(12) United States Patent
Himmelmann (10) Patent No.: US 9,783,298 B2
(45) Date of Patent: Oct. 10, 2017

(54) NOISE REDUCTION BARRIER FOR AIR CUSHION SUPPORTED AIRCRAFT CARGO LOADING ROBOT

(71) Applicant: GOODRICH CORPORATION, Charlotte, NC (US)

(72) Inventor: Richard A. Himmelmann, Beloit, WI (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/337,536

(22) Filed: Oct. 28, 2016

(65) Prior Publication Data

US 2017/0043874 A1    Feb. 16, 2017

Related U.S. Application Data

(62) Division of application No. 14/512,118, filed on Oct. 10, 2014, now Pat. No. 9,511,861.

(51) Int. Cl.
*B65G 51/03* (2006.01)
*B64D 9/00* (2006.01)
*B60V 3/02* (2006.01)

(52) U.S. Cl.
CPC ............... *B64D 9/00* (2013.01); *B60V 3/025* (2013.01); *B65G 51/03* (2013.01); *B64D 2009/006* (2013.01); *B65G 2814/0398* (2013.01)

(58) Field of Classification Search
CPC  B65G 51/03; B65G 25/04; B65G 2814/0398; B64C 1/20; B64C 1/22; B64D 9/00; B64D 1/10; B64D 2009/006; H02J 7/025; B64F 1/32

USPC ..... 406/51, 73, 76, 88, 192, 198; 198/468.6, 198/468.9; 244/118.1, 137.1; 414/676

See application file for complete search history.

(56) References Cited

U.S. PATENT DOCUMENTS

| | | |
|---|---|---|
| 1,437,964 A | 12/1922 | Fitch |
| 2,918,183 A | 12/1959 | Peterson |
| 3,055,446 A | 9/1962 | Vaughen |
| 3,081,886 A | 3/1963 | Flexman et al. |
| 3,190,460 A | 6/1965 | Rubin |
| 3,209,929 A | 10/1965 | Petersen et al. |
| 3,282,359 A | 11/1966 | Satterfield, Jr. |

(Continued)

FOREIGN PATENT DOCUMENTS

| | | |
|---|---|---|
| AU | 442872 | 11/1973 |
| BE | 723545 | 4/1969 |

(Continued)

OTHER PUBLICATIONS

Restriction Requirement dated Apr. 20, 2017 in U.S. Appl. No. 15/373,536.

(Continued)

*Primary Examiner* — Joseph Dillon, Jr.
(74) *Attorney, Agent, or Firm* — Timothy Buckley; Snell & Wilmer L.L.P.

(57) ABSTRACT

An air cushion cargo shuttle for loading and unloading cargo on an airplane is described. The air cushion cargo shuttle includes a first inner air curtain defining a first volume of pressurized air. The air cushion cargo shuttle also includes a noise barrier curtain enclosing the first inner air curtain. The noise barrier curtain is adapted to trap air leaking from the first inner air curtain.

11 Claims, 5 Drawing Sheets

(56) References Cited

U.S. PATENT DOCUMENTS

| | | | |
|---|---|---|---|
| 3,513,934 A | 5/1970 | Crowley | |
| 3,561,623 A | 2/1971 | McCaul | |
| 3,595,407 A * | 7/1971 | Muller-Kuhn | B64F 1/32 244/137.1 |
| 3,597,117 A | 8/1971 | Zoehfield | |
| 3,756,342 A | 9/1973 | Burdick | |
| 3,756,544 A | 9/1973 | Bader | |
| 3,773,391 A | 11/1973 | Crandall et al. | |
| 3,776,492 A | 12/1973 | Iben | |
| 3,780,823 A | 12/1973 | Michaud | |
| 3,796,279 A | 3/1974 | Burdick | |
| 3,807,035 A | 4/1974 | Moorman | |
| 3,809,268 A | 5/1974 | Lutz | |
| 3,869,028 A | 3/1975 | Sawada | |
| 3,899,092 A | 8/1975 | Nordstrom | |
| 3,908,785 A | 9/1975 | Vaughen | |
| 3,986,605 A | 10/1976 | Dooley et al. | |
| 4,131,320 A | 12/1978 | Volat et al. | |
| 4,139,071 A | 2/1979 | Tackett | |
| 4,155,421 A | 5/1979 | Johnson | |
| 4,216,927 A | 8/1980 | Byrd | |
| 4,304,521 A | 12/1981 | Hammond | |
| 4,353,457 A | 10/1982 | Haley | |
| 4,354,796 A | 10/1982 | Bergman | |
| 4,441,571 A | 4/1984 | Wood | |
| 4,544,319 A | 10/1985 | Folling et al. | |
| 4,567,957 A | 2/1986 | Johnson | |
| 4,600,169 A | 7/1986 | Koster et al. | |
| 4,618,292 A | 10/1986 | Judge et al. | |
| 4,658,951 A * | 4/1987 | Saunders | B65G 47/261 198/718 |
| 4,676,699 A | 6/1987 | Leonov | |
| 4,804,077 A | 2/1989 | John, Jr. | |
| 4,815,926 A | 3/1989 | Chaffee et al. | |
| 4,878,635 A | 11/1989 | Nordstrom | |
| 4,951,770 A | 8/1990 | Vaughen | |
| 4,984,756 A | 1/1991 | Anders | |
| 5,120,184 A | 6/1992 | Gerawan | |
| 5,137,367 A | 8/1992 | Madonia et al. | |
| 5,184,366 A | 2/1993 | Rawdon | |
| 5,207,115 A | 5/1993 | Takei | |
| 5,226,773 A | 7/1993 | Morito et al. | |
| 5,311,973 A | 5/1994 | Tseng et al. | |
| 5,350,270 A | 9/1994 | Stallard et al. | |
| 5,456,556 A | 10/1995 | Petrovic | |
| 5,467,827 A * | 11/1995 | McLoughlin | A62C 27/00 137/355.17 |
| 5,634,636 A | 6/1997 | Jackson et al. | |
| 5,690,567 A | 11/1997 | DeNijs et al. | |
| 5,779,296 A * | 7/1998 | Hewko | A61G 1/06 244/118.6 |
| 5,850,906 A | 12/1998 | Dean | |
| 5,893,450 A | 4/1999 | Metivier | |
| 6,193,043 B1 * | 2/2001 | Langston | B65G 13/11 193/35 SS |
| 6,196,788 B1 | 3/2001 | Talbot et al. | |
| 6,296,588 B1 | 10/2001 | Ciemniecki | |
| 6,310,286 B1 | 10/2001 | Troxel | |
| 6,427,947 B1 | 8/2002 | Rohrlick et al. | |
| 6,495,761 B1 | 12/2002 | Hacker | |
| 6,517,028 B2 | 2/2003 | Huber | |
| 6,630,633 B1 | 10/2003 | Uber et al. | |
| 6,640,963 B2 | 11/2003 | Lecrivain | |
| 6,923,606 B2 * | 8/2005 | Fehrle | A61G 1/06 211/173 |
| 7,073,994 B2 | 7/2006 | Huber et al. | |
| 7,108,474 B2 | 9/2006 | Moriya et al. | |
| 7,210,280 B2 | 5/2007 | Cottone et al. | |
| 7,393,159 B2 | 7/2008 | Chang et al. | |
| 7,426,974 B1 | 9/2008 | Yeghiayan | |
| 7,494,004 B2 | 2/2009 | Stolyar et al. | |
| 7,513,716 B2 | 4/2009 | Hayashi et al. | |
| 7,643,133 B2 | 1/2010 | Milender et al. | |
| 7,695,235 B1 | 4/2010 | Rallis | |
| 7,785,056 B2 | 8/2010 | Sanford et al. | |
| 7,800,009 B2 | 9/2010 | Gochar, Jr. | |
| 7,845,898 B2 | 12/2010 | Rawdon et al. | |
| 7,886,920 B2 * | 2/2011 | Colley | A63J 5/12 212/316 |
| 7,913,950 B2 | 3/2011 | Huber | |
| 8,056,701 B2 | 11/2011 | Sugimoto | |
| 8,162,571 B2 | 4/2012 | Wada et al. | |
| 8,356,966 B2 | 1/2013 | Voorhees | |
| 8,376,124 B1 | 2/2013 | Rosen | |
| 8,499,922 B2 | 8/2013 | Hoshi | |
| 8,602,204 B2 | 12/2013 | Yang et al. | |
| 8,960,607 B2 * | 2/2015 | Dorris, III | B64D 1/10 244/137.1 |
| 9,156,553 B1 | 10/2015 | Johnson | |
| 9,205,923 B1 | 12/2015 | Himmelmann | |
| 9,284,130 B1 | 3/2016 | Himmelmann | |
| 9,290,270 B2 | 3/2016 | Himmelmann | |
| 9,352,835 B2 | 5/2016 | Himmelmann | |
| 9,387,931 B2 | 7/2016 | Himmelmann | |
| 9,452,901 B2 | 9/2016 | Panzram | |
| 9,511,860 B2 | 12/2016 | Himmelmann | |
| 9,511,861 B2 | 12/2016 | Himmelmann | |
| 9,555,888 B2 | 1/2017 | Himmelmann | |
| 9,567,166 B2 | 2/2017 | Himmelmann | |
| 2002/0164236 A1 | 11/2002 | Fukuhara | |
| 2003/0121726 A1 * | 7/2003 | Berends | B66F 7/20 187/209 |
| 2004/0241267 A1 | 12/2004 | Schultz | |
| 2004/0245397 A1 | 12/2004 | Garcia et al. | |
| 2005/0063809 A1 * | 3/2005 | Walker | B65G 17/002 414/528 |
| 2006/0096395 A1 * | 5/2006 | Weiss | B65G 49/061 73/865.9 |
| 2007/0007391 A1 | 1/2007 | McCoskey et al. | |
| 2007/0023259 A1 | 2/2007 | Schonauer | |
| 2007/0025832 A1 | 2/2007 | Rawdon et al. | |
| 2007/0074891 A1 | 4/2007 | Burke | |
| 2007/0125908 A1 | 6/2007 | Eichholz et al. | |
| 2008/0011119 A1 | 1/2008 | Bartosch | |
| 2008/0257692 A1 | 10/2008 | Wallace | |
| 2008/0267751 A1 | 10/2008 | Safir | |
| 2009/0252568 A1 | 10/2009 | Morin | |
| 2009/0304482 A1 | 12/2009 | Sanford | |
| 2010/0000459 A1 * | 1/2010 | Colangelo | B63B 35/40 114/259 |
| 2010/0006401 A1 | 1/2010 | Flury et al. | |
| 2010/0212982 A1 * | 8/2010 | Lin | B60V 3/025 180/124 |
| 2011/0079427 A1 * | 4/2011 | Powale | H01B 3/427 174/72 A |
| 2011/0215198 A1 | 9/2011 | Panzram et al. | |
| 2011/0240805 A1 | 10/2011 | Komiya | |
| 2011/0273313 A1 | 11/2011 | Hettwer | |
| 2012/0014757 A1 | 1/2012 | Muller et al. | |
| 2012/0138434 A1 | 6/2012 | Trieb | |
| 2012/0170227 A1 | 7/2012 | Bayliss | |
| 2012/0262849 A1 | 10/2012 | Prax et al. | |
| 2013/0011230 A1 * | 1/2013 | Barry | B61D 47/00 414/399 |
| 2013/0075065 A1 | 3/2013 | Degner et al. | |
| 2013/0287505 A1 | 10/2013 | Seibt et al. | |
| 2013/0313073 A1 | 11/2013 | Huber | |
| 2014/0097296 A1 | 4/2014 | Sankrithi | |
| 2014/0338557 A1 | 11/2014 | Zhou | |
| 2014/0367515 A1 | 12/2014 | Lohmann et al. | |
| 2014/0373747 A1 | 12/2014 | Yagci | |
| 2014/0377017 A1 | 12/2014 | Panzram et al. | |
| 2015/0158404 A1 * | 6/2015 | Pylypenko | B60N 2/525 248/575 |
| 2015/0225082 A1 | 8/2015 | Levron | |
| 2015/0298808 A1 | 10/2015 | Huber | |
| 2016/0052630 A1 | 2/2016 | Himmelmann | |
| 2016/0101857 A1 | 4/2016 | Himmelmann et al. | |
| 2016/0101858 A1 | 4/2016 | Himmelmann | |
| 2016/0101859 A1 | 4/2016 | Himmelmann | |
| 2016/0101860 A1 | 4/2016 | Himmelmann | |
| 2016/0101861 A1 | 4/2016 | Himmelmann | |

(56) References Cited

U.S. PATENT DOCUMENTS

| | | | |
|---|---|---|---|
| 2016/0101862 | A1 | 4/2016 | Himmelmann |
| 2016/0101863 | A1 | 4/2016 | Himmelmann |
| 2016/0101947 | A1 | 4/2016 | Himmelmann |
| 2016/0194081 | A1 | 7/2016 | Himmelmann |
| 2016/0194083 | A1 | 7/2016 | Himmelmann |
| 2016/0221763 | A1 | 8/2016 | Himmelmann |
| 2017/0036763 | A1 | 2/2017 | Himmelmann |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 0377692 | 7/1990 |
| EP | 1547893 | 6/2005 |
| EP | 2815970 | 12/2014 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |
| WO | 2014049590 | 4/2014 |

OTHER PUBLICATIONS

Notice of Allowance dated May 16, 2017 in U.S. Appl. No. 14/512,056.
U.S. Appl. No. 15/373,536, filed Dec. 9, 2016 and entitled Pressure Compensating Air Curtain for Air Cushion Supported Cargo Loading Platform.
Corrected Notice of Allowability dated Dec. 15, 2016 in U.S. Appl. No. 14/512,127.
Office Action dated Dec. 15, 2016 in U.S. Appl. No. 14/511,902.
Notice of Allowance dated Dec. 21, 2016 in U.S. Appl. No. 14/610,391.
Preinterview First Office Action dated Dec. 21, 2016 in U.S. Appl. No. 14/589,742.
U.S. Appl. No. 15/393,423, filed Dec. 29, 2016 and entitled Compact Centrifgual Air Blowers for Air Cushion Supported Cargo Loading Platform.
Extended European Search Report dated Jul. 4, 2016 in European Application No. 15189110.8.
Notice of Allowance dated Oct. 4, 2016 in U.S. Appl. No. 14/512,127.
Notice of Allowance dated Oct. 7, 2016 in U.S. Appl. No. 14/512,118.
Notice of Allowance dated Oct. 11, 2016 in U.S. Appl. No. 14/512,066.
Preinterview First Office Action dated Oct. 25, 2016 in U.S. Appl. No. 14/610,391.
Office Action dated Oct. 26, 2016 in U.S. Appl. No. 14/511,559.
Corrected Notice of Allowability dated Oct. 27, 2016 in U.S. Appl. No. 14/512,118.
Corrected Notice of Allowability dated Oct. 27, 2016 in U.S. Appl. No. 14/512,127.
Corrected Notice of Allowability dated Nov. 1, 2016 in U.S. Appl. No. 14/512,011.
Notice of Allowance dated Oct. 11, 2016 in U.S. Appl. No. 14/512,011.
Extended European Search Report dated Jun. 22, 2016 in European Application No. 16153483.9.
Partial European Search Report dated Mar. 18, 2016 in European Application No. 15189110.8.
Extended European Search Report dated Feb. 9, 2016 in European Application No. 15181603.0.
Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Extended European Search Report dated Jul. 11, 2016 in European Application No. 16150150.7.
Preinterview First Office Action dated Sep. 8, 2016 in U.S. Appl. No. 14/512,056.
Supplemental Notice of Allowability dated Jun. 3, 2016 in U.S. Appl. No. 14/512,113.
Preinterview First Office Action dated Jun. 30, 2016 in U.S. Appl. No. 14/512,056.
Notice of Allowance dated Apr. 1, 2016 in U.S. Appl. No. 14/511,645.
Final Office Action dated Apr. 22, 2016 in U.S. Appl. No. 14/511,559.
Supplemental Notice of Allowability dated May 3, 2016 in U.S. Appl. No. 14/512,113.
Notice of Allowance dated Mar. 24, 2016 in U.S. Appl. No. 14/512,113.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability dated Jan. 7, 2016 in U.S. Appl. No. 14/464,323.
Preinterview First Office Action dated Jan. 7, 2016 in U.S. Appl. No. 14/512,113.
Notice of Allowance dated Jan. 20, 2016 in U.S. Appl. No. 14/511,553.
Notice of Allowance dated Oct. 19, 2015 in U.S. Appl. No. 14/512,000.
Preinterview First Office Action dated Sep. 4, 2015 in U.S. Appl. No. 14/512,000.
Himmelmann, et al., U.S. Appl. No. 15/373,536, filed Dec. 9, 2016 and entitled Pressure Compensating Air Curtain for Air Cushion Supported Cargo Loading Platform.
Himmelmann, et al., U.S. Appl. No. 15/393,423, filed Dec. 29, 2016 and entitled Compact Centrifgual Air Blowers for Air Cushion Supported Cargo Loading Platform.
Final Office Action dated Feb. 24, 2017 in U.S. Appl. No. 14/512,056.
Notice of Allowance dated Mar. 10, 2017 in U.S. Appl. No. 14/511,559.
Corrected Notice of Allowability dated Apr. 10, 2017 in U.S. Appl. No. 14/511,559.
First Action Interview Office Action dated Apr. 18, 2017 in U.S. Appl. No. 14/589,742.

* cited by examiner

NOISE REDUCTION BARRIER FOR AIR CUSHION SUPPORTED AIRCRAFT CARGO LOADING ROBOT

CROSS REFERENCE TO RELATED APPLICATIONS

This application is a division of application serial number U.S. Ser. No. 14/512,118 filed Oct. 10, 2014 for NOISE REDUCTION BARRIER FOR AIR CUSHION SUPPORTED AIRCRAFT CARGO LOADING ROBOT.

FIELD

The present disclosure relates generally to cargo management systems.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

An air cushion cargo shuttle for loading and unloading cargo on an airplane is described. The air cushion cargo shuttle includes a first inner air curtain defining a first volume of pressurized air. The air cushion cargo shuttle also includes a noise barrier curtain enclosing the first inner air curtain. The noise barrier curtain is adapted to trap air leaking from the first inner air curtain.

Also described is a method for preventing leakage air from escaping an air cushion cargo shuttle. The air cushion cargo shuttle has an inner air curtain that forms a volume of pressurized air underneath the air cushion cargo shuttle. The method includes providing a noise barrier curtain that encloses the inner air curtain.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
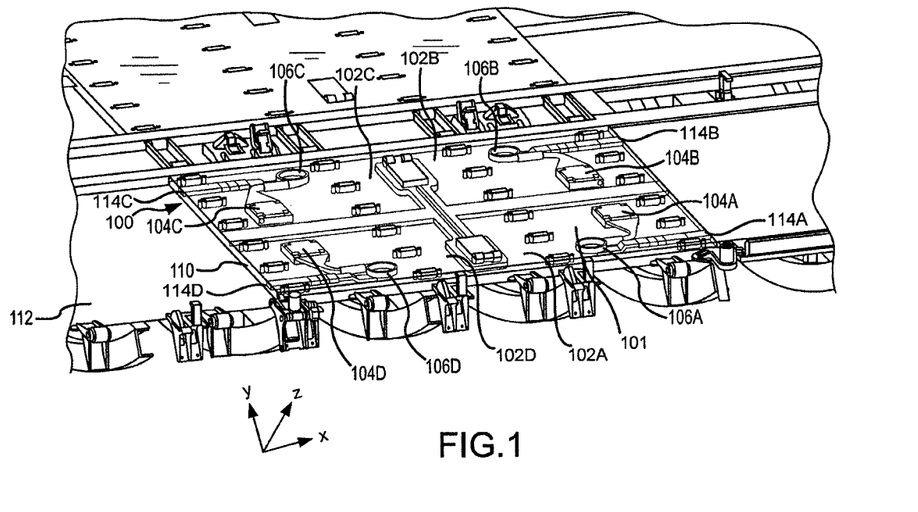
FIG. 1 illustrates an air cushion cargo shuttle on a floor panel, in accordance with various embodiments.

FIG. 1 illustrates an air cushion cargo shuttle 100 on a floor panel 112. Air cushion cargo shuttle 100 is designed to lift above floor panel 112 by increasing air pressure underneath air cushion cargo shuttle 100 within perimeter 110. The pressurized air underneath air cushion cargo shuttle 100 counteracts gravitational pull on air cushion cargo shuttle 100, thus raising air cushion cargo shuttle 100 off floor panel 112.

Air cushion cargo shuttle 100 includes four volumes 102. In various embodiments, air cushion cargo shuttle can include any number of volumes. Volume 102A includes a centrifugal air blower (also referred to as an air blower) 106A. Inlet 114A is adapted to receive air external to air cushion cargo shuttle 100. Air blower 106A receives air from inlet 114A and blows the air into volume 102A, increasing the air pressure in volume 102A. The amount of air that flows through air blower 106A is controlled by centrifugal air blower controller (also referred to as a controller) 104A.

Each of the four volumes 102 includes an air blower 106 connected to an inlet 114 and a controller 104. The air pressure under each volume 102 (e.g., volume 102A) may be different than the air pressure under the other volumes 102 (e.g., volume 102B, 102C and 102D). This allows air cushion cargo shuttle 100 to provide different amounts of upward force (i.e., force in the positive Z direction) throughout air cushion cargo shuttle 100 to account for unbalanced cargo.

In FIG. 1, a top surface 101 of air cushion cargo shuttle 100 is transparent. Top surface 101 is positioned at the top of air cushion cargo shuttle 100 and is adapted to receive cargo. Top surface 101 is positioned at the farthest end of air cushion cargo shuttle 100 in the positive Z direction.

Figure 2:
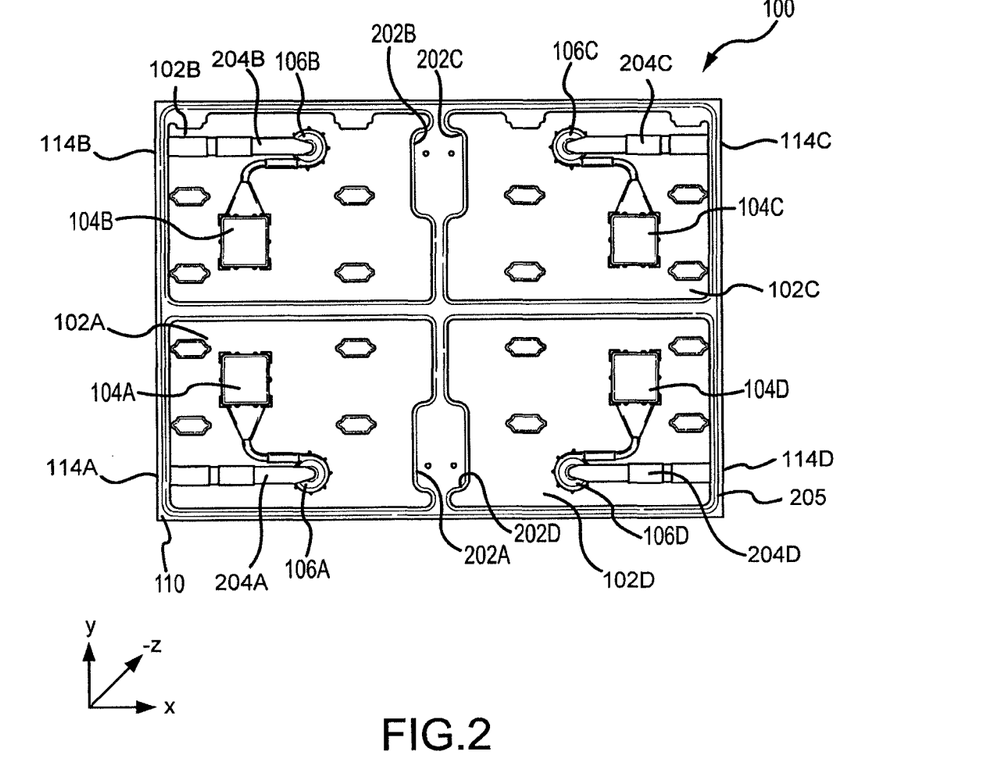
FIG. 2 illustrates an air cushion cargo shuttle from a view underneath the air cushion cargo shuttle, in accordance with various embodiments.

FIG. 2 illustrates air cushion cargo shuttle 100 from a view underneath air cushion cargo shuttle 100. An X-Y-Z axis is illustrated, where the negative Z axis is illustrated extending from the bottom of air cushion cargo shuttle 100 and the positive Z direction extends from the top of air cushion cargo shuttle 100. Air blower 106A is attached to an inlet duct 204A which receives air from inlet 114A. Air blower 106A is also attached to controller 104A which controls the amount of air moved by air blower 106A.

When air cushion cargo shuttle 100 is in an upright position (i.e., top plate 101 is farthest upward, in the positive Z direction), volumes 102 may be filled with pressurized air. This pressurized air may cause air cushion cargo shuttle 100 to lift above floor panel 112. As illustrated, volume 102A is enclosed by a pressure compensated air curtain 202A. Pressure compensated air curtain 202A is adapted to keep pressurized air from escaping volume 102A. When air cushion cargo shuttle 100 is lifted above floor panel 112, pressure compensated air curtain 202A extends towards and contacts floor panel 112. In order to maintain contact with floor panel 112 so that pressurized air does not escape volume 102A, force may be exerted on pressure compensated air curtain 202A. This force is provided by springs between air cushion cargo shuttle 100 and floor panel 112 and is backed by air pressure in volume 102A. By using pressurized air as an additional downward force (i.e., in the negative Z direction) to push pressure compensated air curtain 202A against floor panel 112, the higher the air pressure in volume 102A is, the more force is exerted from pressure compensated air curtain 202A to floor panel 112. This forms a seal between pressure compensated air curtain 202A and floor panel 112.

In various embodiments, volume 102A may include air pressurized at a pressure between 0 pounds per square inch (psi) (~27.5 kPa) and 4 psi. Even though pressure compensated air curtain 202A is sealed against floor panel 112 by spring force as well as pressure compensated force, some air leakage may still occur. This leakage air may be traveling at a high velocity, resulting in an undesirably loud sound. On cargo aircraft, this loud sound may be unpleasant for operators. On passenger aircraft, this loud sound may be unpleasant for operators as well as airline passengers.

Volume 102A includes air blower 106A for blowing air from inlet 114A into volume 102A. Pressure compensated air curtain 202A prevents the air blown into volume 102A from escaping. Together, air blower 106A and pressure compensated air curtain 202A can cause air pressure in volume 102A to increase. Volume 102B, 102C and 102D can be pressurized in the same fashion using pressure compensated air curtain 202B, 202C and 202D, and air blower 106B, 106C and 106D.

Within the perimeter 110 of air cushion cargo shuttle 100, a noise barrier curtain 205 is positioned. Noise barrier curtain 205 encloses all volumes 102 as well as pressure compensated air curtains 202. Noise barrier curtains 204 are considered to be downstream with respect to pressure from the pressure compensated air curtains 202. Air that leaks through any pressure compensated air curtain 202 will be prevented from escaping air cushion cargo shuttle 100 by noise barrier curtain 205. Noise barrier curtain 205 may direct air that escapes from volumes 102 back towards an inlet 114. By redirecting the leakage air, noise barrier curtain 205 dissipates the sound of the high velocity leakage air.

If excessive or prolonged friction occurs between noise barrier curtain 205 and floor panel 112, then noise barrier curtain 205 and/or floor panel 112 may wear out. It is therefore desirable that noise barrier curtain 205 be friction resistant. Noise barrier curtain 205 may be made from a friction resistant polymer, such as polytetrafluoroethylene (PTFE) (available under the trademark TEFLON), natural and/or synthetic rubber, fiber-reinforced PTFE, and other suitable materials. In various embodiments, noise barrier curtain 205 may include multiple materials.

Figure 5:
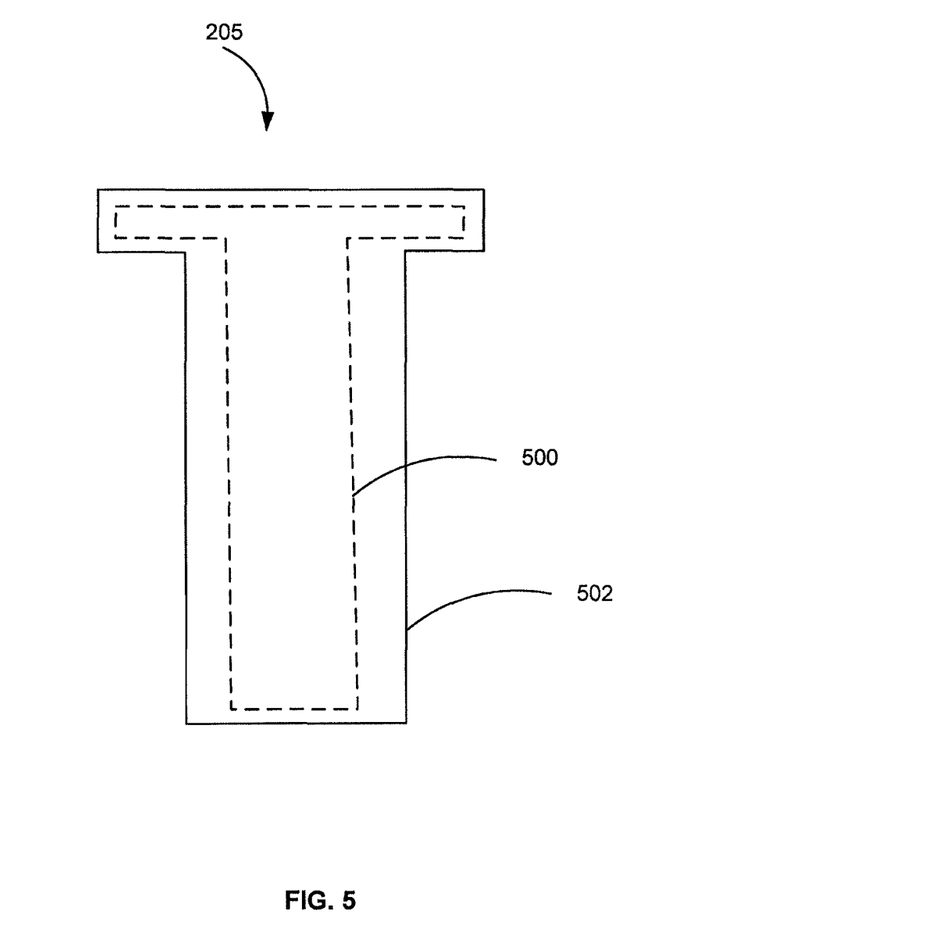
FIG. 5 illustrates a cross-sectional view of a noise barrier curtain including multiple materials, in accordance with various embodiments.

FIG. 5 illustrates a cross-sectional view of noise barrier curtain 205 including multiple materials. Noise barrier curtain 205 may include a backing 500, which may be stiff. Backing 500 may allow a portion of noise barrier curtain to be rigid. Backing 500 may be, for example, springy foam, a spring or springs, etc. Backing 500 may be surrounded with a contact surface 502. Contact surface 502 may be made from a friction resistant polymer, such as PTFE, rubber, fiber-reinforced PTFE, etc. In various embodiments, contact surface 502 may be soft as well as friction resistant. In this regard, the term "soft" in this context only may mean that contact surface 502 is not difficult to mold, compress and/or fold. Because contact surface 502 is friction resistant, friction between floor panel 112 and contact surface 502 may cause reduced wear on noise barrier curtain 205 and/or floor panel 112.

As well as acting as a noise barrier against air leakage from pressure compensated air curtains 202, noise barrier curtain 205 may keep debris from collecting on floor panel 112 and from reaching pressure compensated air curtains 202. As air cushion cargo shuttle travels over floor panel 112, noise barrier curtain 205 may collect debris and transport it to the aft or forward end of the cargo bay. This debris may then be swept away after it has been collected by noise barrier curtain 205. By removing debris, noise barrier curtain 205 keeps abrasive particles from causing wear to pressure compensated air curtains 202, and reduces cleaning times and costs of the aircraft.

In various embodiments, only one noise barrier curtain 205 is utilized in air cushion cargo shuttle. In preferred embodiments, noise barrier curtain 205 is positioned near the perimeter 110 of air cushion cargo shuttle 100, so as to enclose all volumes 102. Because noise barrier curtain 205 traps air leaking from all volumes 102 and redirects it towards an inlet 114, leakage air may not create a noise problem.

Figure 3:
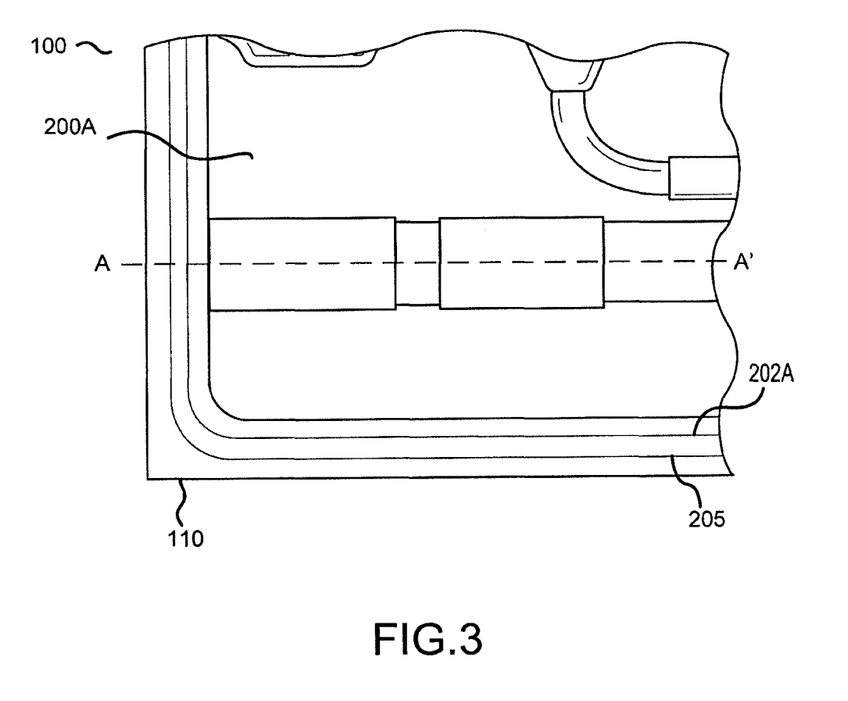
FIG. 3 illustrates a bottom view of a portion of a volume of an air cushion cargo shuttle, in accordance with various embodiments.

FIG. 3 illustrates a bottom view of a portion of volume 102A of air cushion cargo shuttle 100. FIG. 3 illustrates that pressure compensated air curtain 202A is positioned within noise barrier curtain 205, which is positioned within perimeter 110.

Figure 4:
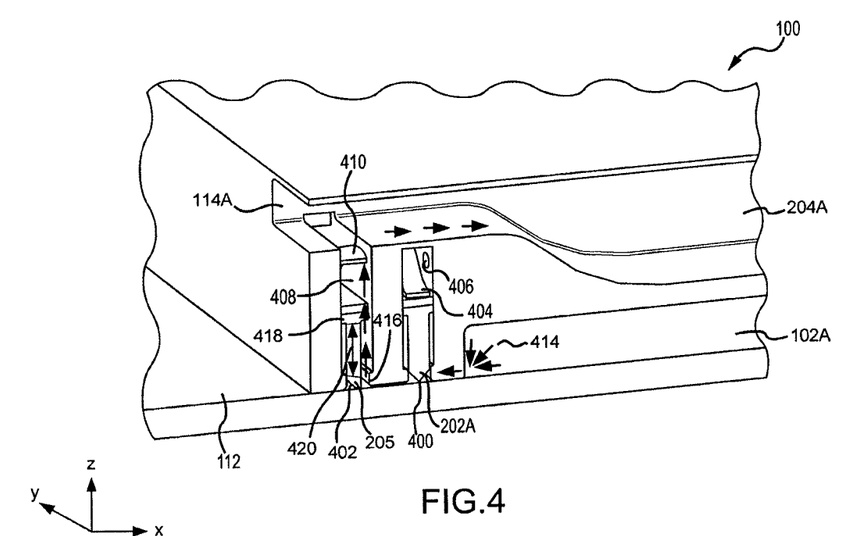
FIG. 4 illustrates a cross-sectional view of an air cushion cargo shuttle 100 along a line A-A' illustrated in FIG. 3, in accordance with various embodiments.

FIG. 4 illustrates a cross-sectional view of air cushion cargo shuttle 100 along line A-A' from FIG. 3. The X-Y-Z axis is shown to illustrate relative position of components. Inlet 114A is illustrated on the side of air cushion cargo shuttle 100. Air enters air cushion cargo shuttle 100 through inlet 114A where it travels through inlet duct 204A towards air blower 106A. Air blower 106A then blows air from inlet 114A into volume 102A. An amount of air inside of volume 102A then increases, resulting in higher air pressure within volume 102A.

As previously mentioned, some air may leak from volume 102A. Leakage air is illustrated by arrows 414. Most air within volume 102A is contained by pressure compensated air curtain 202A. Pressure compensated air curtain 202A forms a contact point 400 with floor panel 112. A spring 404 pushes pressure compensated air curtain 202A towards floor panel 112. In various embodiments, spring 404 may be a wave spring, coil springs, springy foam or the like. Pressurized air also exerts additional force on pressure compensated air curtain 202A via pressure supply hole 406.

Pressure compensated air curtain 202A is designed to keep pressurized air from escaping volume 102A. However, as indicated by arrows 414, some air may still escape pressure compensated air curtain 202A. Noise barrier curtain 205 is adapted to contain this leakage air. Noise barrier curtain 205 includes a spring 410 above noise barrier curtain 205. Spring 410 exerts force onto the top (i.e., exerts force in the negative Z direction) of noise barrier curtain 205, thus forming a seal between noise barrier curtain 205 and floor panel 112 at contact point 402. Generally, air between noise barrier curtain 205 and volume 102A will not be highly pressurized. Air pressure between noise barrier curtain 205 and pressure compensated air curtain 202A is substantially the same as the air pressure in air passage 408, which is approximately zero psi relative to the ambient pressure. Therefore, spring 410 exerts sufficient force on noise barrier curtain 205 to prevent leakage air from escaping noise barrier curtain 205.

Leakage air from volume 102A is then directed towards inlet 114A. Air passage 408 exists between noise barrier curtain 205 and inlet 114A. Leakage air, as indicated by arrows 414, travels through air passage 408 after it is stopped by noise barrier curtain 205. This leakage air is then channeled towards inlet duct 204A where it joins air from inlet 114A. By allowing leakage air to be sucked back into inlet duct 204A, noise created from high velocity leakage air past pressure compensated air curtain 202A is reduced or removed.

Noise barrier curtain 205 is adapted to move parallel to the Z axis within air cushion cargo shuttle 100. This is to allow noise barrier curtain 205 to remain in contact with floor panel 112 when air cushion cargo shuttle 100 is lifted above floor panel 112.

Noise barrier curtain 205 includes a lip 418. Air cushion cargo shuttle 100 also includes a lip 416. Lip 416 and lip 418 are adapted to prevent noise barrier curtain 205 from extending too far in the negative Z direction from air cushion cargo shuttle 100. Noise barrier curtain 205 is adapted to extend outward towards floor panel 112 (in the negative Z direction) for a distance 420 between lip 418 and lip 416. When lip 418 meets lip 416, noise barrier curtain 205 can extend no further towards floor panel 112. Distance 420 may be, for example, one quarter of an inch or less. Because floor panel 112 will preferably be flat and smooth, it is not necessary for air cushion cargo shuttle 100 to be raised much above floor panel 112. A quarter of an inch is generally sufficient lift for air cushion cargo shuttle 100 to travel across floor panel 112.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An air cushion cargo shuttle configured and operable for loading and unloading cargo on an aircraft via mating engagement with an aircraft support rails comprising:
   a top surface for receiving cargo;
   a first inner air curtain defining a first volume; and a pressure compensating air cushion within the first volume
   a noise barrier curtain enclosing the first inner air curtain configured to trap air leaking from the first inner air curtain.

2. The air cushion cargo shuttle of claim 1, further comprising an air blower having an inlet configured to draw air from outside the first volume and blow the air into the first volume.

3. The air cushion cargo shuttle of claim 2, wherein the noise barrier curtain is further configured to redirect the air leaking from the first inner air curtain towards the inlet.

4. The air cushion cargo shuttle of claim 1, further comprising a spring in contact with the noise barrier curtain and configured to force the noise barrier curtain downwards towards a floor panel.

5. The air cushion cargo shuttle of claim 1, further comprising a second inner air curtain defining a second volume, a third inner air curtain defining a third volume and a fourth inner air curtain defining a fourth volume, wherein the noise barrier curtain encloses the second inner air curtain, the third inner air curtain and the fourth inner air curtain.

6. The air cushion cargo shuttle of claim 1, further comprising a lower lip positioned around the noise barrier curtain wherein the noise barrier curtain includes an upper lip that is adapted to prevent the noise barrier curtain from extending in response to the upper lip contacting the lower lip.

7. The air cushion cargo shuttle of claim 6, wherein a gap exists between the upper lip and the lower lip that is no more than a quarter of an inch in distance.

8. The air cushion cargo shuttle of claim 1, wherein the noise barrier curtain is resistant to friction.

9. The air cushion cargo shuttle of claim 1, wherein the noise barrier curtain is formed from a friction resistant polymer.

10. The air cushion cargo shuttle of claim 1, wherein the noise barrier curtain is configured to collect debris as the air cushion cargo shuttle travels along a floor panel.

11. The air cushion cargo shuttle of claim 1, wherein the noise barrier curtain includes a stiff backing and a contact surface that is friction resistant.

* * * * *